(12) United States Patent
Yanai (10) Patent No.: US 7,533,898 B2
(45) Date of Patent: May 19, 2009

(54) AIRBAG COVER, INSTRUMENT PANEL, AND AIRBAG APPARATUS

(75) Inventor: Shinnosuke Yanai, Tokyo (JP)

(73) Assignee: Takata Corporation, Tokyo (JP)

( * ) Notice: Subject to any disclaimer, the term of this patent is extended or adjusted under 35 U.S.C. 154(b) by 0 days.

(21) Appl. No.: 11/905,015

(22) Filed: Sep. 27, 2007

(65) Prior Publication Data

US 2008/0106077 A1 May 8, 2008

(30) Foreign Application Priority Data

Nov. 6, 2006 (JP) .............................. 2006-300413

(51) Int. Cl.
*B60R 21/16* (2006.01)
(52) U.S. Cl. .................. 280/728.2; 280/728.3; 280/732
(58) Field of Classification Search ............. 280/728.3, 280/731, 732, 728.2
See application file for complete search history.

(56) References Cited

U.S. PATENT DOCUMENTS

| | | | | |
|---|---|---|---|---|
| 6,742,804 B2 * | 6/2004 | Suzuki et al. | ............ | 280/728.3 |
| 7,007,970 B2 * | 3/2006 | Yasuda et al. | ............ | 280/728.3 |
| 7,165,782 B2 * | 1/2007 | Yasuda et al. | ............ | 280/728.3 |
| 7,178,825 B2 * | 2/2007 | Fujii et al. | ............... | 280/728.3 |
| 7,234,724 B1 * | 6/2007 | Cowelchuk et al. | ...... | 280/728.2 |
| 7,234,726 B2 * | 6/2007 | Trevino et al. | ........... | 280/728.3 |
| 7,354,061 B2 * | 4/2008 | Yasuda et al. | ............ | 280/728.3 |
| 2003/0184063 A1 * | 10/2003 | Yasuda et al. | ............... | 280/732 |
| 2004/0075215 A1 * | 4/2004 | Snow et al. | .................. | 273/292 |
| 2008/0073885 A1 * | 3/2008 | Cowelchuk et al. | ...... | 280/728.3 |

FOREIGN PATENT DOCUMENTS

| JP | 2004-009708 | 1/2004 |
|---|---|---|
| JP | 2005-205800 | 8/2005 |

\* cited by examiner

*Primary Examiner*—Toan C To
(74) *Attorney, Agent, or Firm*—Manabu Kanesaka

(57) ABSTRACT

An airbag cover to be mounted on a vehicle includes a housing case for housing a passenger airbag; an airbag-cover body portion extending along a surface facing an occupant in a passenger seat; a tear line formed in the airbag-cover body portion for rupturing the airbag cover; and a plate-shaped developing door partitioned by the tear line in the airbag-cover body portion to be ruptured and developed at the tear line by being pressed by a developing-and-expanding load of the passenger airbag. The plate-shaped developing door further includes a first developing portion with standing portions, and a second developing portion attached to the case. A contacting area is formed between the standing portions and the second developing portion for vibration welding to thereby connect the first developing portion and the second developing portion.

9 Claims, 5 Drawing Sheets

REAR SIDE OF VEHICLE ←

FRONT SIDE OF VEHICLE →

AIRBAG COVER, INSTRUMENT PANEL, AND AIRBAG APPARATUS

BACKGROUND OF THE INVENTION AND RELATED ART STATEMENT

The present invention relates to a construction technology of an airbag cover mounted on a passenger airbag of a vehicle.

For example, an example of a conventional passenger airbag apparatus is disclosed in the following patent document 1 (Japanese Unexamined Patent Application Publication No. 2004-338633)

In the passenger airbag apparatus, a tear line for use in rupturing an airbag cover is provided in an airbag cover for covering a passenger airbag. The airbag cover is ruptured along the tear line when the vehicle is in collision and a developing door is developed, and the airbag cover allows the passenger airbag to be developed and expanded outside the airbag cover. Further, in the passenger airbag apparatus, a housing case for housing the passenger airbag is jointed on a rear surface of an airbag-cover body portion by means of a vibration welding operation.

Incidentally, in designing this kind of airbag apparatus, it is required that the housing case for housing the passenger airbag is assuredly jointed to the airbag cover side by means of the vibration welding operation. Specifically, in a case that the airbag-cover body portion is formed into a curved shape in designing or the like, the curved shape disturbs a vibrating motion of the vibration welding operation, and there is a high demand for uniformly jointing a portion where the body of the airbag cover and the housing case face each other by devising a structure regarding the vibration welding operation.

Accordingly, the present invention is made in consideration of the above-described view point, and in the airbag cover for covering the passenger airbag of the vehicle, the invention provides a technology effective for assuredly jointing the housing case side for housing the passenger airbag and the airbag-cover body portion side by means of the vibration welding operation.

Further objects and advantages of the invention will be apparent from the following description of the invention.

SUMMARY OF THE INVENTION

In order to solve the aforementioned problems, the invention described in each aspect is constructed. Incidentally, the present invention is applicable to various kinds of vehicles, and typically applied to a construction relating to an airbag cover mounted on a passenger seat of a vehicle.

The airbag cover according to the present invention is an airbag cover mounted on a vehicle and is provided with at least a housing case, an airbag-cover body portion, a tear line, and a developing door. The housing case according to the present invention is provided with a function to house a passenger airbag. The housing case may be constructed to house the entire passenger airbag, or partially house the passenger airbag. The airbag-cover body portion according to the present invention is constructed by extending along a surface facing an occupant in a passenger seat, in which the housing case is jointed to a surface of a side opposite to the occupant in the passenger seat, and covering the passenger airbag housed in the housing case. The tear line according to the present invention is constructed as a tear line (line-to-be-ruptured) for rupturing the airbag cover, formed in the airbag-cover body portion. The tear line is typically a thin-walled portion formed in a plate-thickness direction of the airbag-cover body portion by means of a supersonic machining or a laser beam machining, and is sometimes also called as a "thin-walled portion" or a "reduced thickness portion". Incidentally, in the present invention, the tear line is conformed to part of or whole of a rupturing line in which the airbag cover ruptures along the tear line for real. Namely, it is sufficient that the tear line is provided with a function to form the rupturing line such that the airbag cover is brought to a required rupturing configuration, and the rupturing line may be formed exceeding the tear line.

The developing door according to the present invention is constructed as a plate-shaped portion partitioned by means of the tear line in the airbag-cover body portion, and ruptured and developed at the tear line by being pressed by a developing-and-expanding load of the passenger airbag. Specifically, the developing door according to the present invention is further constructed by including a first developing portion provided on an airbag-cover body portion side, a second developing portion provided on a housing case side, an extending surface extending on a side facing the first developing portion in the second developing portion, a plurality of standing upright portions standing upright on the first developing portion side as a base end toward the extending surface on the second developing portion side, and a contacting area being brought into contact with the extending surface at each of tip end portions of the plurality of standing upright portions in a vibration welding operation for the first developing portion and the second developing portion.

In the present construction, the extending surface extending in the second developing portion may be constructed by including a flat surface portion to be in contact with tip end portions of a plurality of standing upright portions as a flat surface as a whole. Alternatively, the extending surface may be constructed as a surface provided with a lattice-shaped protruding portion (sometimes also called a rib), and a tip end portion of the protruding portion (a portion being in contact with the tip end portions of the plurality of standing upright portions) may be formed to have a flat surface shape. Further, in the present construction, the plurality of standing upright portions can be formed on the whole or part of the first developing portion. In addition, the plurality of contacting areas formed on the plurality of standing upright portions has a construction to form a surface corresponding to the extending surface (sometimes also called as "modeled surface"). The contacting area formed on a tip end portion of each of the standing upright portions can be brought into contact with the extending surface by a line contact or a point contact.

Incidentally, the construction "to form a surface corresponding to an extending surface" mentioned above typically refers to a configuration such that a virtual surface connecting the plurality of contacting areas formed on the plurality of standing upright portions is approximately conformed (overlapped) to the flat surface portion of the extending surface in a case that the plurality of contacting areas is brought into contact with the extending surface. Furthermore, the first developing portion and the second developing portion are constructed to be jointed to each other by means of vibration welding operation by being relatively vibrated in a vibrating direction along the extending surface in a condition where the plurality of contacting areas forming a surface corresponding to the extending surface is brought into contact with the extending surface.

In accordance with such a construction of the airbag cover according to the present invention as described above, the plurality of contacting areas formed on tip end portions of the plurality of standing upright portions forms a surface corresponding to the extending surface, and therefore when the first developing portion and the second developing portion are relatively vibrated in a vibrating direction along the extending surface in the vibration welding operation, an interference of the first developing portion with the second developing portion can be prevented, and a vibrating motion is not inhibited and is smoothly performed. Hence, an inherent jointing effect of the vibration welding operation can be achieved. Accordingly, it is effective to assuredly perform a jointing operation for the housing case side for housing the passenger airbag and the airbag-cover body portion side by means of the vibration welding operation.

Specifically, in a case where a portion on an occupant side of the airbag-cover body portion is formed to be a curved shape concaved in a direction opposite to the occupant, or a case where a portion on the occupant side is formed to be a curved shape that is protruding out in a direction to the occupant, by a reason in designing or the like, the portion of the curved shape may interfere with the housing case and therefore the vibrating motion of the vibration welding operation may be disturbed. Nevertheless, it becomes possible to uniformly joint the portion where the first developing portion and the second developing portion face each other by means of the vibration welding operation by adopting the aforementioned construction. Incidentally, although this construction is specifically effective for assuredly jointing the first developing portion and the second developing potion in the case that the airbag-cover body portion is formed to be a curved shape, it can be said that an effect to assuredly joint the first developing portion and the second developing portion is obtained even in a case where the airbag-cover body portion is formed to be a flat plate shape.

An instrument panel according to the present invention is an instrument panel longitudinally extending in a left-right direction in front of a front seat of a vehicle, and is formed to have a construction where the airbag cover body portion having the above-described construction is integrally provided. Accordingly, in accordance with such a construction of the instrument panel according to the present invention, it is possible to provide a built-in airbag cover instrument panel provided with an airbag cover effective for assuredly performing the jointing operation by means of the vibration welding operation for the side of the housing case for housing the passenger airbag and the side of the airbag-cover body portion.

Incidentally, the currently described "instrument panel" refers to a panel body (sometimes called as "dashboard") extending in a left-right direction (width direction of a vehicle) in front of a driver's seat and the passenger seat in a vehicle interior, namely, extending between a front window and the occupant in the front seat. The instrument panel is defined as a panel body not only including panels surrounding the measuring meters such as a speed meter, a tachometer, and the like in front of the driver's seat, but also widely including an entire panel, on which a glove compartment where small objects are put therein at the passenger seat side, an airbag module for the passenger seat, or the like are mounted. Further, the instrument panel can also be referred to as "instrument panel" including a blowing outlet for use in a car air-conditioner, and a portion where the car stereo system is stored.

The airbag apparatus according to the present invention includes at least a passenger airbag, a housing case, a gas supply device, and an airbag cover.

The passenger airbag according to the present invention is constructed as an airbag for restraining an occupant in the passenger seat when the vehicle accident occurs. The housing case according to the present invention is constructed as an airbag housing body for housing the passenger airbag that is folded back in a predetermined configuration such as a roll folding configuration, a bellows folding configuration, a machine folding configuration, or the like in advance. The gas supply device according to the present invention has a function to supply an expanding gas into the passenger airbag so that the passenger airbag is developed and expanded while protruding out from the airbag housing body when the vehicle accident occurs. Constructions of the airbag-cover body portion, the tear line, and the developing door in the airbag cover according to the present invention are similar to the constructions of the respective airbag-cover body portion, the tear line, and the developing door of the above-described airbag cover.

Hence, according to such a construction of the airbag apparatus of the present invention, it is possible to prove an airbag apparatus provided with an airbag cover effective for assuredly jointing a side of the housing case for housing the passenger airbag with a side of the airbag-cover body portion by means of a vibration welding operation.

As described above, according to the present invention, in an airbag cover for covering a passenger airbag of a vehicle, it becomes capable of assuredly jointing a side of a housing case for housing the passenger airbag with a side of an airbag-cover body portion.

DETAILED DESCRIPTION OF PREFERRED EMBODIMENTS

Hereinbelow, an airbag apparatus 100 as an embodiment of an "airbag apparatus" according to the present invention will be explained with reference to the drawings. The airbag apparatus 100 is, although not specifically illustrated, mounted on a passenger seat of a vehicle, and is constructed as a passenger airbag apparatus where the occupant in the passenger seat is restrained by means of a passenger airbag when a vehicle accident occurs.

Figure 1:
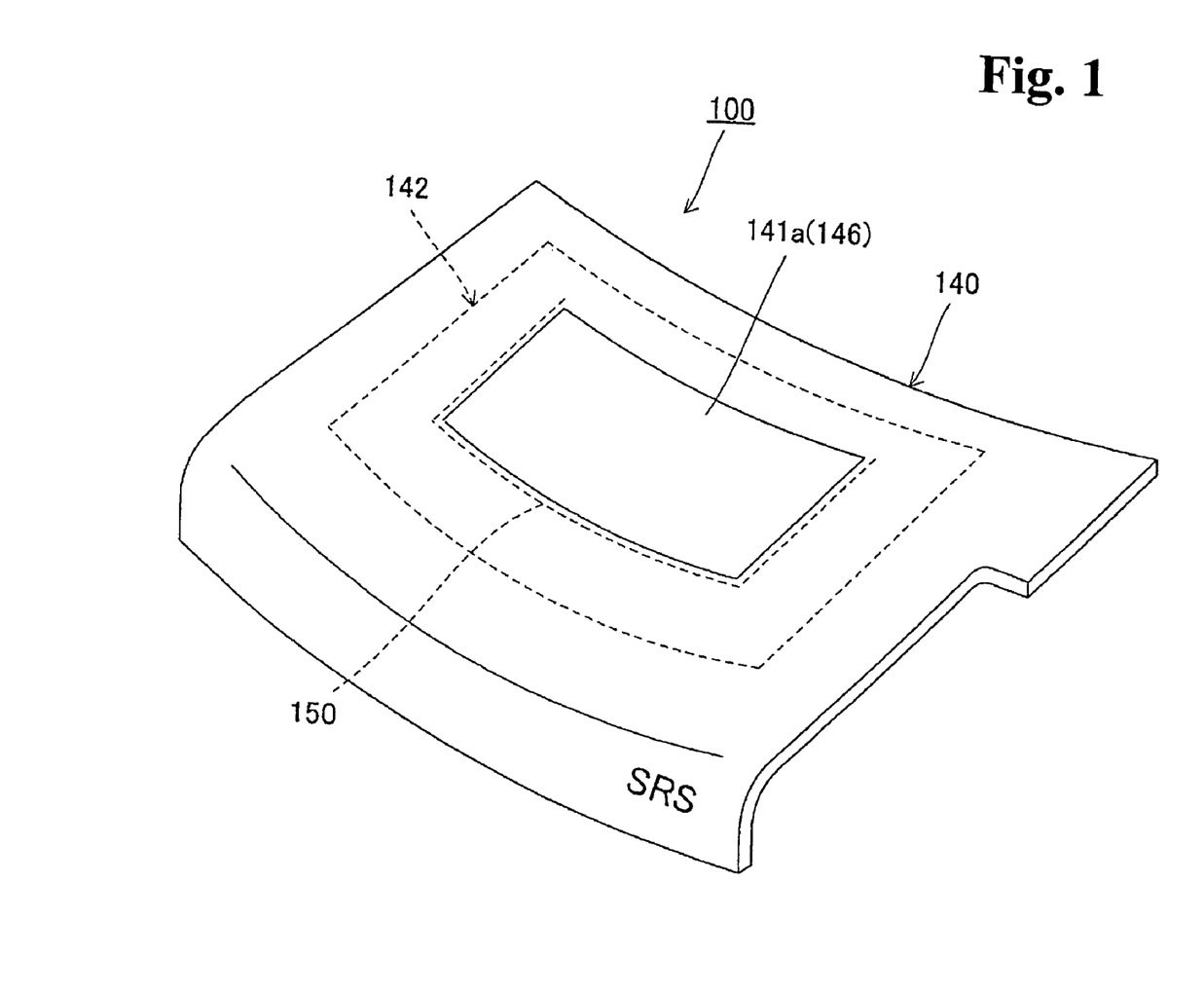
FIG. 1 is a perspective view illustrating an airbag apparatus according to the present embodiment.
Figure 2:
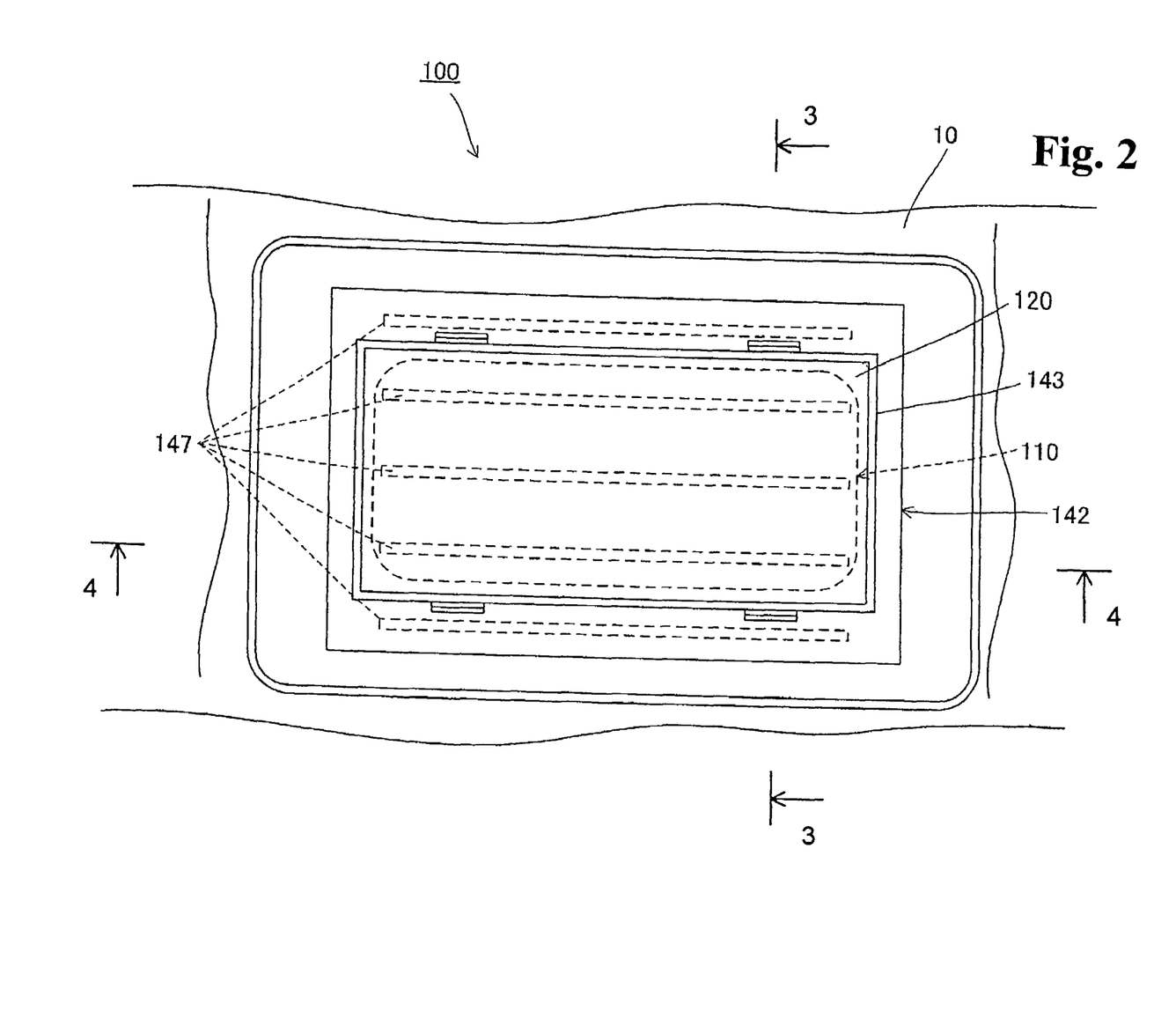
FIG. 2 is a plan view illustrating the airbag apparatus in FIG. 1 looking from a rear surface of an airbag cover.
Figure 3:
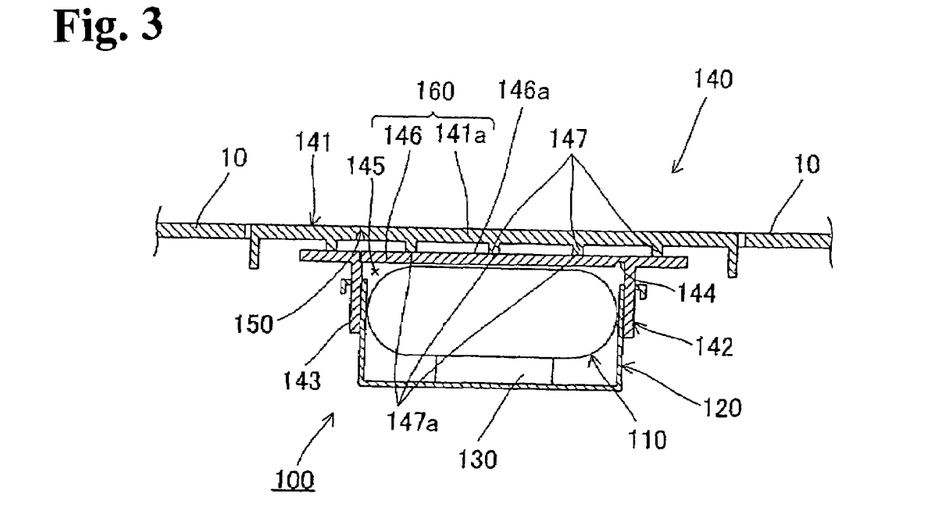
FIG. 3 is a view illustrating a cross-sectional structure of the airbag apparatus in FIG. 2 taking along line 3-3.
Figure 4:
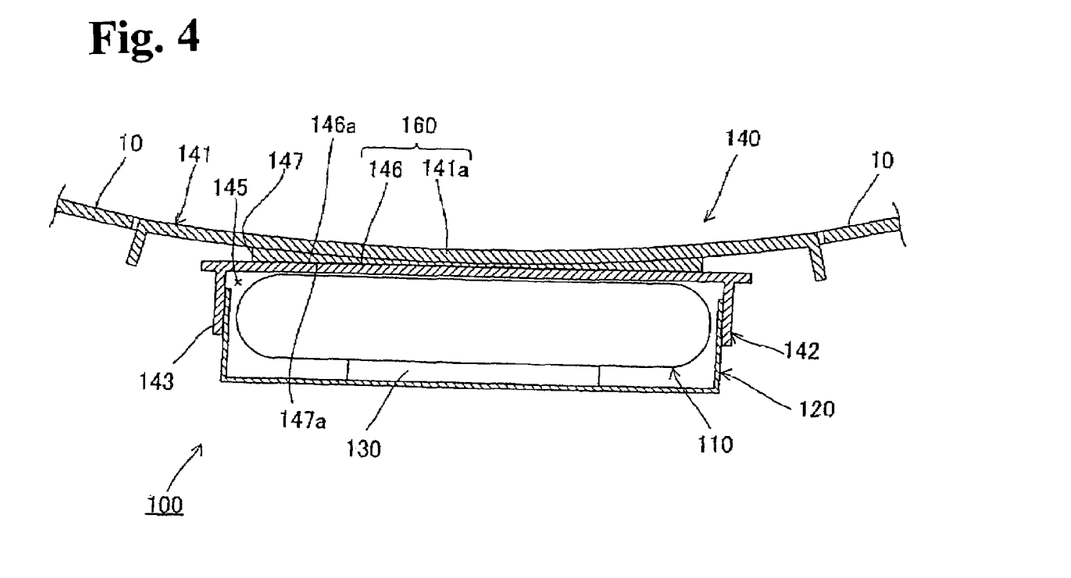
FIG. 4 is a view illustrating a cross-sectional structure of the airbag apparatus in FIG. 2 taking along line 4-4.

First, referring now to FIG. 1 through FIG. 4, a construction of the airbag apparatus 100 according to the present embodiment will be explained. Currently, in FIG. 1, a perspective view of the airbag apparatus 100 according to the present embodiment is illustrated, and a plan view of the airbag apparatus 100 in FIG. 1 looking from the back surface of the airbag cover is illustrated in FIG. 2. Further, a cross-sectional structure of the airbag apparatus 100 in FIG. 2 taken along line 3-3 is illustrated in FIG. 3, and a cross-sectional structure of the airbag apparatus 100 in FIG. 2 taken along line 4-4 is illustrated in FIG. 4.

As illustrated in FIG. 1 through FIG. 4, the airbag apparatus 100 according to the present embodiment is mainly composed of an airbag 110, a retainer 120, an inflator 130, and an airbag cover 140. The airbag apparatus 100 is sometimes called as "airbag module".

The airbag 110 is developed and expanded while protruding toward the passenger seat side when the vehicle accident occurs, and the airbag 110 in a condition of being developed and expanded restrains the occupant seated in the passenger seat. This airbag corresponds to the "passenger airbag" in the present invention.

The retainer 120 has a function serving as an airbag housing body for housing the airbag 100 folded back in a predetermined folding-back configuration (a roll folding configuration, a bellows folding configuration, a machine folding configuration, or the like) in advance. This retainer 120 corresponds to the "housing case" in the present invention.

The inflator 130 has a function serving as a gas supply device for supplying an expanding gas to the airbag 110 while generating the same when the vehicle accident occurs. This inflator 130 constitutes a "gas supply device" in the present invention.

The airbag cover 140 is disposed in an instrument panel 10 of the vehicle, and is provided with a function serving as a covering body for covering the airbag 110 in a condition being housed in the retainer 120. The airbag cover 140 is provided with at least an airbag-cover body portion 141, a frame-shaped body 142, a tear line 150, and a developing door portion 160. This airbag cover 140 corresponds to the "airbag cover" in the present invention.

Incidentally, the instrument panel 10 is an instrument panel longitudinally extending in a left-right direction in front of a front seat of the vehicle, and is provided with a construction where the airbag cover 140 is integrally provided by means of a vibration welding operation or the like. This instrument panel 10 is a panel body (sometimes called as "dashboard") extending in the left-right direction (width direction of the vehicle) in front of the driver's seat and the passenger seat in a vehicle interior, namely, between a front window and the occupant in the front seat. The instrument panel 10 is defined as a panel body not only including panels surrounding the measuring meters such as a speed meter, a tachometer, and the like in front of the driver's seat, but also widely including an entire panel on which the airbag 110 according to the present embodiment or the like is mounted, and a glove compartment where small objects are put therein at the passenger seat side. Further, the instrument panel 10 can also be defined including a blowing outlet for use in a car air-conditioner, and a portion where the car stereo system is stored. The currently described instrument panel 10 corresponds to the "instrument panel" in the present invention.

The airbag-cover body portion 141 is constructed as a plate-shaped portion extending along a surface facing the occupant in the passenger seat. The airbag-cover body portion 141 is formed of a resin material such as PP (polypropylene) material, TPO (olefin base elastomer) material, or the like. Further, a resin-made skin may sometimes be coated on an outer surface thereof. This airbag-cover body portion 141 corresponds to the "airbag-cover body portion" in the present invention.

At a rear surface of the airbag-cover body portion 141, a tear line 150 constructed as a line-to-be-ruptured for use in rupturing the airbag cover is formed. The tear line 150 is typically a thin-walled portion formed in a plate-thickness direction of the airbag-cover body portion 141 by means of a supersonic machining or a laser beam machining. The tear line 150 is sometimes also called as a "thin-walled portion" or a "reduced thickness portion". This tear line 150 corresponds to the "tear line for use in rupturing an airbag cover" in the present invention.

In the airbag-cover body portion 141, a portion to be opened (hereinafter referred to as "opening portion") 141a partitioned by the tear line 150 is developed (sometimes also referred to as "opened") with a flap portion 146 described later by rupturing at the tear line 150 when the airbag 110 is developed and expanded. Incidentally, the tear line 150 is conformed to a part of or whole of a rupturing line in which the airbag cover 140 ruptures along the tear line 150 for real. Namely, it is sufficient that the tear line 150 is provided with a function to form the rupturing line such as that the airbag cover 140 is brought to a required rupturing configuration, and the rupturing line may be formed exceeding the tear line 150.

Further, the frame-shaped body 142 is jointed on the rear surface of the airbag-cover body portion 141. The frame-shaped body 142 is provided with a cylindrical portion 143 having a rectangular cylindrical shape and being fixed to the retainer 120, and the flap portion 146 that allows an opening and closing operation of an upper opening 145 of the cylindrical portion 143 via a hinge portion 144. This flap portion 146 has a shape approximately conforming to that of the opening portion 141a.

The developing door portion 160 has a construction including the opening portion 141a on the airbag-cover body portion 141 side, and the flap portion 146 on the frame-shaped body 142 (retainer 120) side. The currently described developing door portion 160 corresponds to the "developing door" in the present invention. Further, in the frame-shaped body 142, an extending surface 146a is formed on a portion including the flap portion 146 facing the opening portion 141a. The extending surface 146a includes a flat surface portion to be in contact with a tip end portion of a rib 147 for use in welding (hereinafter referred to as "rib 147 for welding"), and the same may be constructed as a flat surface as a whole. Alternatively, the extending surface 146a may be constructed as a surface provided with a lattice-shaped protruding portion (some times called as a rib), and a tip end portion of the lattice-shaped protruding portion (a portion being in contact with the tip end portion of the rib 147 for welding) may be formed to have a flat shape.

In the developing door portion 160, the opening portion 141a and the flap portion 146 are jointed to each other when the airbag-cover main body portion 141 and the frame-shaped body 142 are jointed. The currently described opening portion 141a corresponds to the "first developing portion provided on an airbag-cover body portion side" in the present invention, and the currently described flap portion 146 corresponds to the "second developing portion provided on a housing case side" in the present invention. Furthermore, the extending surface 146a of the flap portion 146 corresponds to the "extending surface in the second developing portion, extending in the side facing the first developing portion" in the present invention.

Incidentally, the airbag-cover body portion 141 and the frame-shaped body 142 are jointed with each other by means of a well-known vibration welding method using a plurality of ribs for welding which are standing upright in the plate thickness direction of the airbag-cover body portion 141 on the rear surface (a surface facing an upper surface of the frame-shaped body 142) side of the airbag-cover body portion 141. In the present embodiment, as illustrated in FIG. 3 and FIG. 4, a plurality of (five in number in the present embodiment) ribs 147 for welding that are standing upright on the rear surface side of the airbag-cover body portion 141 is used as the ribs for welding, for performing the vibration welding operation. Each of the plurality of ribs 147 for welding is standing upright toward the extending surface 146a of the flap portion 146, on the rear surface of the airbag-cover body portion 141 as a base end. Moreover, at each of the tip end portions of the plurality of ribs 147 for welding, a flat-surface shaped contacting area 147a is formed. Each of the contacting areas 147a is longitudinally extending along a vibrating direction described later, and is configured to be an area that is brought into contact with the extending surface 146a of the flap portion 146 by a surface contact or a point contact, when the vibration welding operation is performed for the airbag-cover body portion 141 and the frame-shaped body 142. This contacting area 147a corresponds to the "contacting area" in the present invention.

Furthermore, a plurality of contacting areas 147a is constructed to form a surface corresponding to the extending surface 146a of the flap portion 146 (sometimes also called as "modeled surface"). Namely, the construction is formed such that a virtual surface connecting the plurality of contacting areas 147a is approximately conformed (overlapped) to the flat surface portion of the extending surface 146a in a case that the plurality of contacting areas 147a is brought into contact with the extending surface 146a. The currently described rib 147 for welding corresponds to the "standing upright portion" in the present invention. Incidentally, it is sufficient that the rib 147 for welding is constructed to be jointed to the flap portion 146 by means of the vibration welding operation, and the construction may include a reinforcing function for the airbag-cover body portion 141 at the same time, or the construction may be formed as a standing upright portion or a protruding portion that is not particularly provided with the reinforcing function for the airbag-cover body portion 141.

Figure 5:
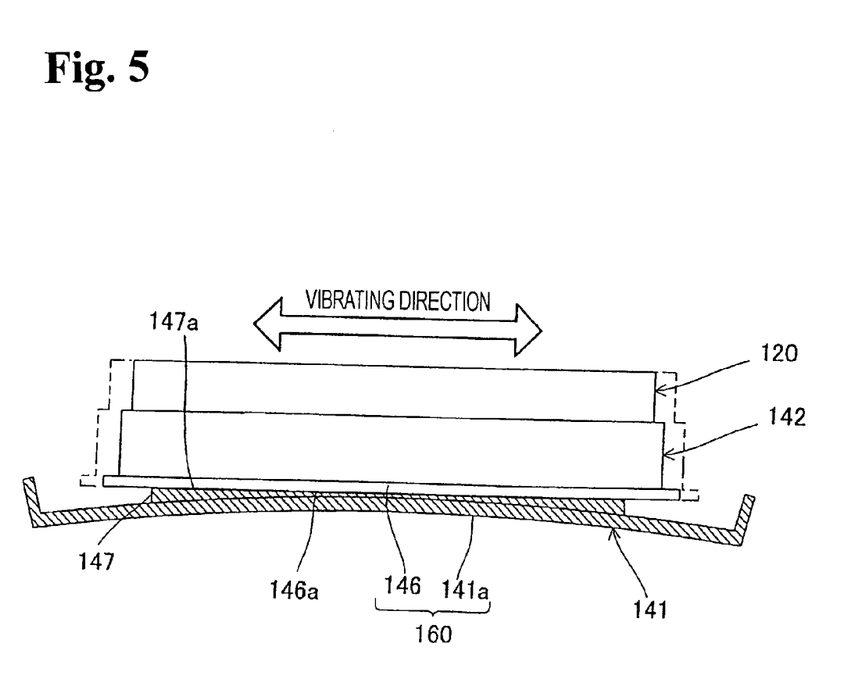
FIG. 5 is a view schematically illustrating a relationship between a construction of a rib for welding and a vibrating direction in a vibration welding operation according to the present embodiment.

Currently, in jointing the airbag-cover body portion 141 with the frame-shaped portion 142, FIG. 5 is referred to with respect to a condition in which the vibration welding operation is performed for the opening portion 141a and the flap portion 146. In FIG. 5, a relationship between the construction of the rib 147 for welding of the present embodiment and the vibrating direction in the vibration welding operation is schematically illustrated. As illustrated in FIG. 5, the opening portion 141a and the flap portion 146 are jointed to each other in the vibration welding operation by being relatively vibrated in the vibrating direction (left and right directions in FIG. 5) along the extending surface 146a via the plurality of ribs 147 for welding. Furthermore, currently, since the construction is formed such that the extending direction of the plurality of ribs 147 for welding is conformed to the vibrating direction, it becomes possible to increase an efficiency of the vibration welding operation.

According to the aforementioned construction regarding the vibration welding operation, the plurality of contacting areas 147a formed at the tip end portion of the plurality of ribs 147 for welding forms a surface corresponding to the extending surface 146a of the flap portion 146. Therefore, when the opening portion 141a and the flap portion 146 are relatively vibrated in the vibrating direction along the extending surface 146a when the vibration welding operation is performed for the same, an operation of the vibration is smoothly performed without disturbance. This results in enabling to obtain an inherent jointing effect of the vibration welding operation. Accordingly, this is effective for assuredly performing the jointing operation by means of the vibration welding operation for the airbag-cover body portion 141 and the frame-shaped body 142.

Specifically, in a case that a portion on an occupant side of the airbag-cover body portion 141 is formed to be a curved shape (the shape as illustrated in FIG. 4) concaved in a direction opposite to the occupant, or that a portion on the occupant side of the airbag-cover body portion 141 is formed to be a curved shape that is protruding out in a direction to the occupant, by a reason in designing or the like, the portion of the curved shape interferes with the frame-shaped portion 142 and thereby the vibrating motion of the vibration welding operation is disturbed. Nevertheless, it becomes possible to uniformly joint the portion where the opening portion 141a and the flap portion 146 face each other by means of the vibration welding operation by adopting the aforementioned construction. Incidentally, although this construction is specifically effective for assuredly jointing the opening portion 141a and the flap potion 146 in the case that the airbag-cover body portion 141 is formed to be a curved shape, it can be said that it is effective to assuredly joint the opening portion 141a and the flap portion 146 even in a case that the airbag-cover body portion 141 is formed to be a flat plate shape.

Figure 6:
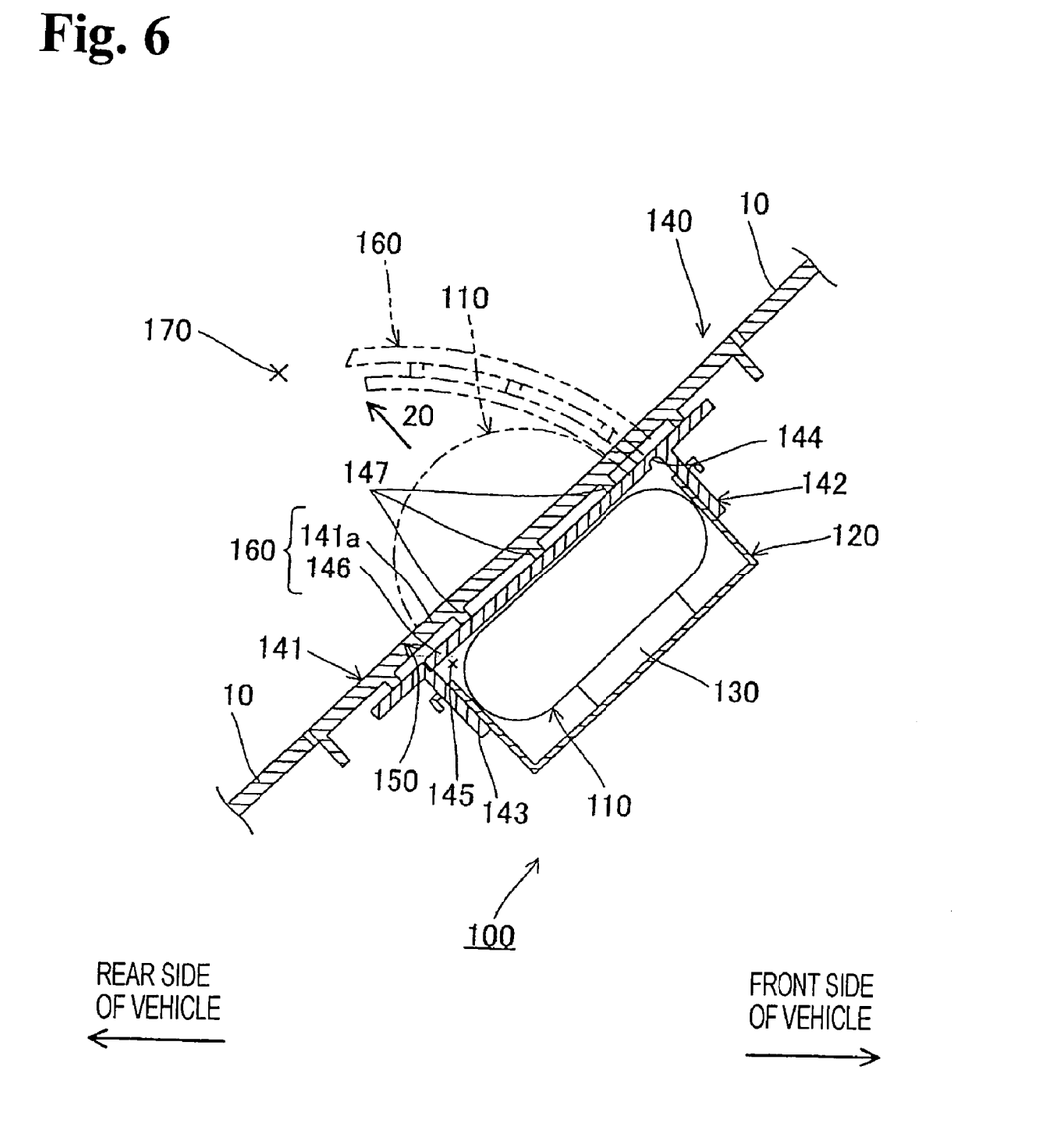
FIG. 6 is a view illustrating a cross-sectional structure of the airbag apparatus at a time of opening an airbag cover according to the present invention.

FIG. 6 is referred to with respect to an operation of the airbag apparatus 100 having the aforementioned construction. Currently, in FIG. 6, a cross-sectional structure of the airbag apparatus 100 when the airbag cover 140 according to the present embodiment is opened is illustrated.

When the vehicle accident occurs, when the collision of the vehicle is detected or a prediction of the collision of the vehicle is performed by means of a sensor (illustration is omitted), the airbag apparatus 100 is operated and an expanding gas is supplied from the inflator 130 to the airbag 110. Therefore, the airbag 110 is developed and expanded while protruding outside the retainer 120 toward a direction indicated by an arrow 20 in FIG. 6. This direction is conformed to a direction toward an occupant-restraining area 170 where an occupant in the passenger seat is restrained by the airbag 110, namely, a direction toward an area where the occupant in the passenger seat exists.

Currently, as illustrated in FIG. 6, the flap portion 146 is pressed by a developing and expanding load of the airbag 110 and starts a developing operation on the airbag-cover body portion 141 side via the hinge portion 144. By means of the further developing and expanding operation of the airbag 110, the airbag-cover body portion 141 is ruptured at the tear line 150, and the plate-shaped developing door portion 160 composed of the opening portion 141a and the flap portion 146 jointed by welding each other is developed in an integral manner (refer to a chain double-dashed line in FIG. 6). Thus, the airbag 110 allowed to protrude outside the airbag cover 140 through the upper opening 145 by means of the developing operation of the developing door portion 160 protrudes outside the airbag cover 140, and is developed and expanded toward the occupant-restraining area 170, and rapidly restrains the occupant in the passenger seat.

As described above, according to the present embodiment, in a jointing operation of the airbag-cover body portion 141 and the frame-shaped body 142, an airbag cover is provided, where the airbag-cover body portion 141 and the frame-shaped body 142 are assuredly jointed by means of the vibration welding operation by using the plurality of ribs 147 for welding provided on the airbag-cover body portion 141 side, and specifically, by adopting a construction where the plurality of contacting areas 147a form a surface corresponding to the extending surface 146a.

Further, according to the present embodiment, a built-in airbag cover instrument panel 10 is provided with an airbag cover, where the airbag-cover body portion 141 and the frame-shaped body 142 are assuredly jointed by means of the vibration welding operation.

Furthermore, according to the present embodiment, an airbag apparatus 100 is provided with an airbag cover, where the airbag-cover body portion 141 and the frame-shaped body 142 are assuredly jointed by means of the vibration welding operation.

Other Embodiment

The present invention is not limited to the aforementioned embodiment, and various applications and modifications are considered. For example, each of the following embodiments, in which aforementioned embodiment is applied, can also be carried out.

Moreover, in the aforementioned embodiment, although a case, in which only the opening portion 141a in the developing door portion 160 is provided with the plurality of ribs 147 for welding, is described, the plurality of ribs 147 for welding can be provided at least in the opening portion 141a in the present invention, and for example, a structure, where the plurality of ribs 147 for welding is provided in both the opening portion 141a and the flap portion 146, can be also adopted.

The disclosure of Japanese Patent Application No. 2006-300413 filed on Nov. 6, 2006 is incorporated as a reference.

While the invention has been explained with reference to the specific embodiments of the invention, the explanation is illustrative and the invention is limited only by the appended claims.

What is claimed is:

1. An airbag cover to be mounted on a vehicle, comprising:
  a housing case for housing a passenger airbag;
  an airbag-cover body portion covering the passenger airbag housed in the housing case and having a tear line for rupturing the airbag cover; and
  a plate-shaped developing door formed in the airbag-cover body portion and defined by the tear line, to be opened upon inflation of the passenger airbag, said plate-shaped developing door comprising:
    a first developing portion provided in the airbag-cover body portion and concavely curved so as to be depressed toward the housing case;
    a second developing portion provided on the housing case and having an extending surface facing the first developing portion;
    a frame member having the second developing portion therein and unitarily formed therewith;
    a plurality of standing portions integrally formed with the first developing portion and extending from the first developing portion toward the extending surface on the second developing portion; and
    a contact area formed at the extending surface and tip end portions of the standing portions, said contact area being arranged to provide vibration welding such that the first developing portion and the second developing portion join together at the standing portions by relative vibration in a vibrating direction along the extending surface.

2. An airbag cover according to claim 1, wherein said plurality of standing portions is arranged parallel to each other and the tip end portions are flat.

3. An airbag cover according to claim 2, wherein said extending surface is flat to contact the tip end portions for vibration welding.

4. An instrument panel longitudinally extending in a left-right direction in front of a front seat of a vehicle, wherein the airbag cover according to claim 1 is integrally provided.

5. An airbag apparatus to be mounted on a vehicle comprising:
  a passenger airbag for restraining an occupant in a passenger seat when a vehicle accident occurs;
  said airbag cover according to claim 1 for covering the passenger airbag in the housing case; and
  a gas supply device for supplying an expanding gas into the passenger airbag so that the passenger airbag is developed and expanded while protruding out from the housing case when the vehicle accident occurs.

6. An airbag cover to be mounted on a vehicle, comprising:
  a housing case for housing a passenger airbag;
  an airbag-cover body portion covering the passenger airbag housed in the housing case, said airbag-cover body portion having a tear line for rupturing the airbag-cover body portion and a first developing portion defined inside the tear line to be opened upon inflation of the passenger airbag;
  a frame body entirely covering the housing case as one member and having a second developing portion with an extending surface facing the first developing portion;
  a plurality of standing portions integrally formed with the first developing portion and extending from the first developing portion toward the extending surface on the second developing portion, said plurality of standing portions having heights different from each other, and tip end portions located in a substantially horizontal plane; and
  a contact area formed at the extending surface and the tip end portions of the standing portions, said contact area being arranged to provide vibration welding such that the first developing portion and the second developing portion join together at the standing portions by relative vibration in a vibrating direction along the extending surface.

7. An airbag cover according to claim 6, wherein said second developing portion is located inside the housing case and has the extending surface.

8. An airbag cover according to claim 7, wherein said frame body includes outside portions located outside the housing case and integrally formed with the second developing portion, said frame body being attached to the housing case at the outside portions.

9. An airbag cover according to claim 8, wherein said airbag-cover body portion is curved.

* * * * *